US012598001B2

(12) United States Patent
Ghuman et al.

(10) Patent No.: US 12,598,001 B2
(45) Date of Patent: Apr. 7, 2026

(54) SYSTEMS AND METHODS FOR PROVIDING A WAVELENGTH INDEPENDENT PASSIVE OPTICAL NETWORK EXTENDER

(71) Applicant: Precision Optical Transceivers Inc., Rochester, NY (US)

(72) Inventors: Harjinder Ghuman, Alpharetta, GA (US); Christopher Page, Rochester, NY (US)

(73) Assignee: PRECISION OPTICAL TRANSCEIVERS INC., Rochester, NY (US)

( * ) Notice: Subject to any disclaimer, the term of this patent is extended or adjusted under 35 U.S.C. 154(b) by 203 days.

(21) Appl. No.: 18/226,577

(22) Filed: Jul. 26, 2023

(65) Prior Publication Data

US 2025/0038852 A1     Jan. 30, 2025

(51) Int. Cl.
H04B 10/29 (2013.01)
H04B 10/293 (2013.01)

(52) U.S. Cl.
CPC ................................. H04B 10/293 (2013.01)

(58) Field of Classification Search
None
See application file for complete search history.

(56) References Cited

U.S. PATENT DOCUMENTS 6,480,326 B2    11/2002   Papernyi et al.
6,535,660 B1     3/2003   Judy 6,603,593 B2     8/2003   Fidric et al.
6,697,558 B2     2/2004   Hansen et al.
6,917,466 B2     7/2005   Namiki et al.
6,985,283 B1     1/2006   Islam et al.
7,672,042 B2     3/2010   Zhou et al.
8,594,502 B2    11/2013   Zhu
9,281,655 B2     3/2016   Bolshtyansky et al.
11,323,788 B1 *  5/2022   Ghuman ............. H04J 14/0227
11,502,770 B2   11/2022   Ghuman
2003/0081307 A1  5/2003   Fludger et al.
(Continued)

FOREIGN PATENT DOCUMENTS

GB         2441016 B      2/2008

OTHER PUBLICATIONS

International Search Report and Written Opinion dated Nov. 7, 2024 in corresponding International Application No. PCT/US24/39254, 9 pages.

*Primary Examiner* — Nathan M Cors
(74) *Attorney, Agent, or Firm* — MH2 TECHNOLOGY LAW GROUP LLP

(57)     ABSTRACT

Systems and methods for operating a passive optical network (PON) extender. The methods comprise: receiving, by the PON extender, a first optical signal from a remote node device of a passive optical network via a first optical link; amplifying the first optical signal using a Raman amplifier of the PON extender to obtain a first Raman amplified optical signal; amplifying the first Raman amplified optical signal using a first optical amplifier of the PON extender to obtain an amplified uplink signal (wherein the first optical amplifier is different than the Raman amplifier); and passing the amplified uplink signal to an optical line terminal via a second optical link (wherein the optical line terminal is disposed locally at a hub site along with the PON extender).

21 Claims, 7 Drawing Sheets

(56)     References Cited

U.S. PATENT DOCUMENTS

| | | | |
|---|---|---|---|
| 2004/0042062 A1* | 3/2004 | Takeda .............. | H04B 10/2916 |
| | | | 359/334 |
| 2006/0018658 A1* | 1/2006 | Mori ................ | H04J 14/02216 |
| | | | 398/79 |
| 2011/0044688 A1* | 2/2011 | Lee ................... | H04B 10/2916 |
| | | | 398/58 |
| 2016/0211918 A1 | 7/2016 | Kamalov et al. | |
| 2022/0190948 A1* | 6/2022 | Ghuman ............ | H04J 14/0213 |

* cited by examiner

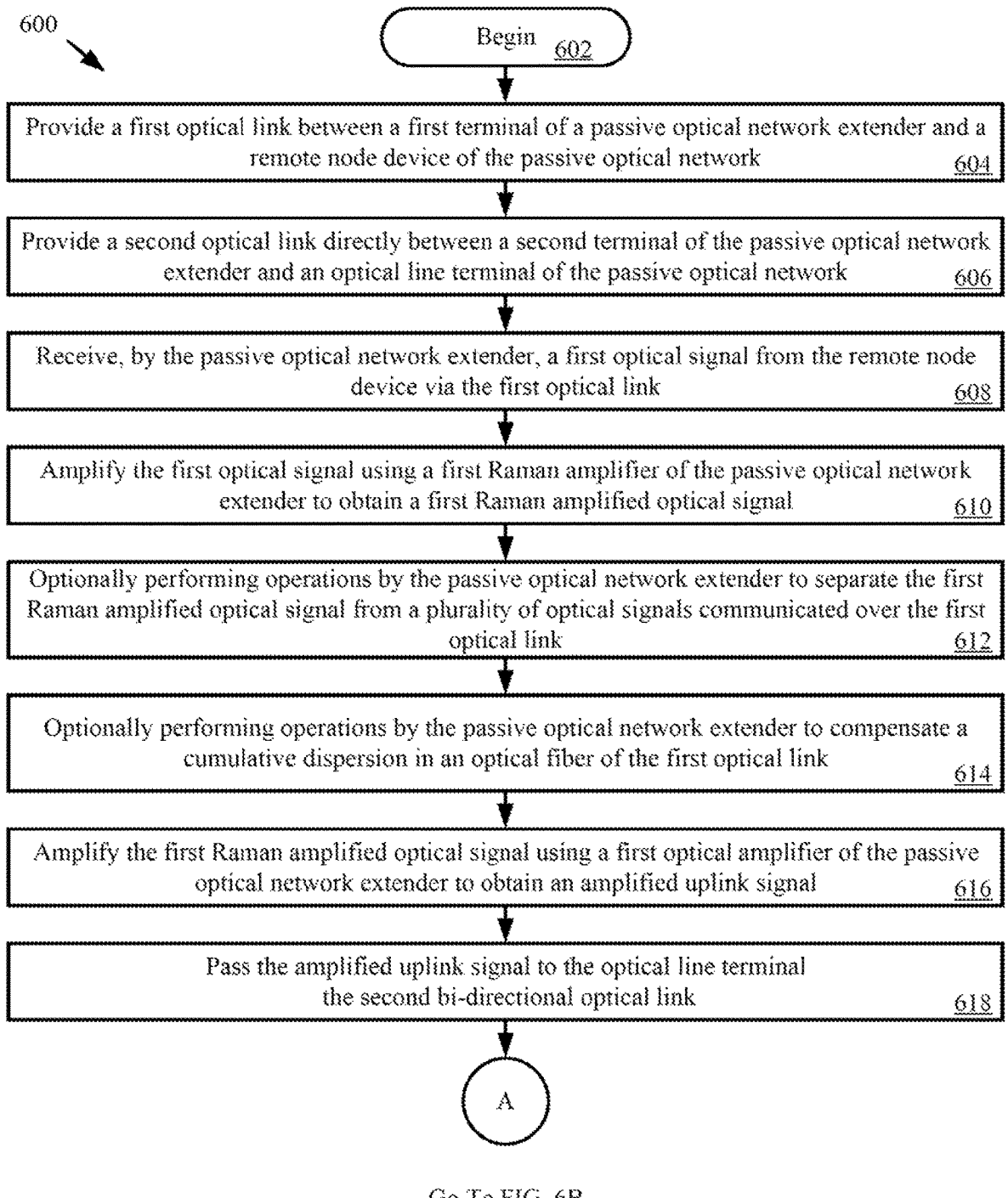

600

Begin 602

Provide a first optical link between a first terminal of a passive optical network extender and a remote node device of the passive optical network          604

Provide a second optical link directly between a second terminal of the passive optical network extender and an optical line terminal of the passive optical network          606

Receive, by the passive optical network extender, a first optical signal from the remote node device via the first optical link          608

Amplify the first optical signal using a first Raman amplifier of the passive optical network extender to obtain a first Raman amplified optical signal          610

Optionally performing operations by the passive optical network extender to separate the first Raman amplified optical signal from a plurality of optical signals communicated over the first optical link          612

Optionally performing operations by the passive optical network extender to compensate a cumulative dispersion in an optical fiber of the first optical link          614

Amplify the first Raman amplified optical signal using a first optical amplifier of the passive optical network extender to obtain an amplified uplink signal          616

Pass the amplified uplink signal to the optical line terminal the second bi-directional optical link          618

SYSTEMS AND METHODS FOR PROVIDING A WAVELENGTH INDEPENDENT PASSIVE OPTICAL NETWORK EXTENDER

BACKGROUND

Description of the Related Art

Passive optical networks (PONs) utilize a single fiber that is passively split multiple times to enable a one-to-many optical datalink. The current PON standards allow for up to a 1:128 or even 1:256 split PON (typical deployment is up to a 1:64 split). Every layer of passive splits incurs an insertion loss (e.g., 3 dB insertion loss) which limits the distance a PON can reach. For example, an illustration is provided in FIG. 1 showing a system comprising 1:8 splitter which incurs 9 dB of insertion loss.

Current standards are limited to a 20 km reach for an optical fiber to passive splitter coupled to end nodes (e.g., houses, buildings, etc.) due to the high loss of the passive splitters combined with the need for inexpensive customer equipment. This inexpensive customer equipment utilize components that limit the optical performance of the system, such as directly modulated lasers.

SUMMARY

The present disclosure concerns implementing systems and methods for operating a PON extender. The methods comprise: providing the first optical link between a first terminal of the PON extender and the remote node device of a PON; providing a second optical link directly between a second terminal of the PON extender and the optical line terminal (OLT) of the PON, by the PON extender, a first optical signal from the remote node device of a PON via the first optical link; amplifying the first optical signal using a first Raman amplifier of the PON extender to obtain a first Raman amplified optical signal; separating the first Raman amplified optical signal from a plurality of optical signals communicated over the first optical link; optionally compensating a cumulative dispersion in an optical fiber of the first optical link; amplifying the first Raman amplified optical signal using a first optical amplifier of the PON extender to obtain an amplified uplink signal; and/or passing the amplified uplink signal to the OLT via the second optical link.

The first optical amplifier is different than the first Raman amplifier. The first optical amplifier may include, but is not limited to, an Erbium-doped fiber amplifier (EDFA) or a semiconductor optical amplifier (SOA). The OLT is disposed locally at a hub site along with the PON extender. Compensation of the cumulative dispersion in the optical fiber may be performed after amplification by the Raman amplifier and before amplification by the first optical amplifier.

The methods may additionally or alternatively comprise: receiving, at the PON extender, a second optical signal from the OLT via the second optical link; performing operations by the PON extender to compensate a cumulative dispersion in an optical fiber of the second optical link; amplifying the second optical signal using a second optical amplifier of the PON extender to obtain an amplified downlink signal; amplifying the amplified downlink optical signal using a second Raman amplifier of the passive optical network extender; and/or passing the amplified downlink signal to the remote node device via the first optical link (e.g., by combining the amplified downlink optical signal with a plurality of optical signals communicated over the second optical link, after amplification by the second optical amplifier and before amplification by the second Raman amplifier). The second optical amplifier can include, but is not limited to, an EDFA or an SOA.

The present disclosure also concerns a system and/or a PON network extender disposed at a hub site. The PON extender comprises: a first terminal configured to receive a first optical signal from a remote node device of a passive optical network via a first optical link; a first Raman amplifier configured to amplify the first optical signal to produce a first Raman amplified optical signal; a first optical amplifier configured to amplify the first Raman amplified optical signal to produce an amplified uplink signal; and a second terminal from which the amplified uplink signal can be passed to an optical line terminal of the passive optical network via a second optical link.

The first optical amplifier is different than the Raman amplifier. The first optical amplifier can include, but is not limited to, an EDFA or an SOA. The OLT is disposed at the hub site along with the PON extender. The first optical link may be provided between the first terminal of the passive optical network extender and the remote node device. The second optical link may be provided directly between the second terminal of the PON extender and the OLT.

The PON extender may also comprises: an optical signal separator that is connected between the Raman amplifier and the first optical amplifier, and that is configured to separate the first optical signal from a plurality of optical signals communicated over the first optical link; and/or a dispersion compensation module (DCM) configured to compensate a cumulative dispersion in an optical fiber of the first optical link. The DCM is disposed between the Raman amplifier and the first optical amplifier such that any compensation of the cumulative dispersion in the optical fiber is performed after amplification by the Raman amplifier and before amplification by the first optical amplifier.

The PON network extender may additionally or alternatively comprise: a second optical amplifier configured to amplify a second optical signal received from the optical line terminal via the second optical link to produce an amplified downlink signal; a second Raman amplifier configured to amplify the amplified downlink optical signal; an optical signal combiner that is disposed between the second Raman amplifier and the second optical amplifier, and that is configured to combine the amplified downlink optical signal with a plurality of optical signals communicated over the second optical link; and/or a DCM configured to compensate a cumulative dispersion in an optical fiber of the second optical link. The second optical amplifier comprises an EDFA or an SOA.

BRIEF DESCRIPTION OF THE DRAWINGS

The present solution will be described with reference to the following drawing figures, in which like numerals represent like items throughout the figures.

FIGS. 6A-6B (collectively referred to as "FIG. 6") provides a flow diagram of an illustrative method for operating a PON extender.

DETAILED DESCRIPTION

Figure 1:
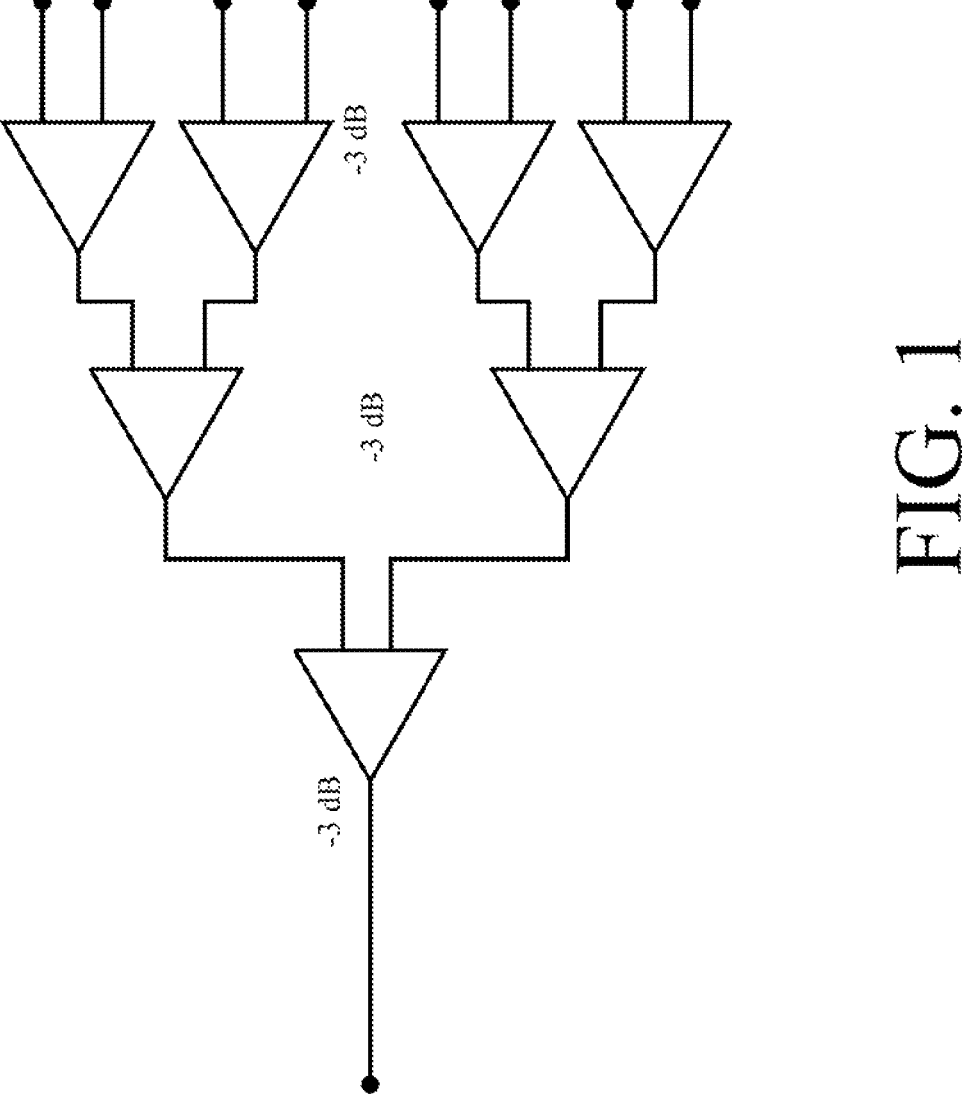
FIG. 1 provides an illustration that is useful for understanding a PON architecture.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In this document, when terms such "first" and "second" are used to modify a noun, such use is simply intended to distinguish one item from another, and is not intended to require a sequential order unless specifically stated.

Figure 2:
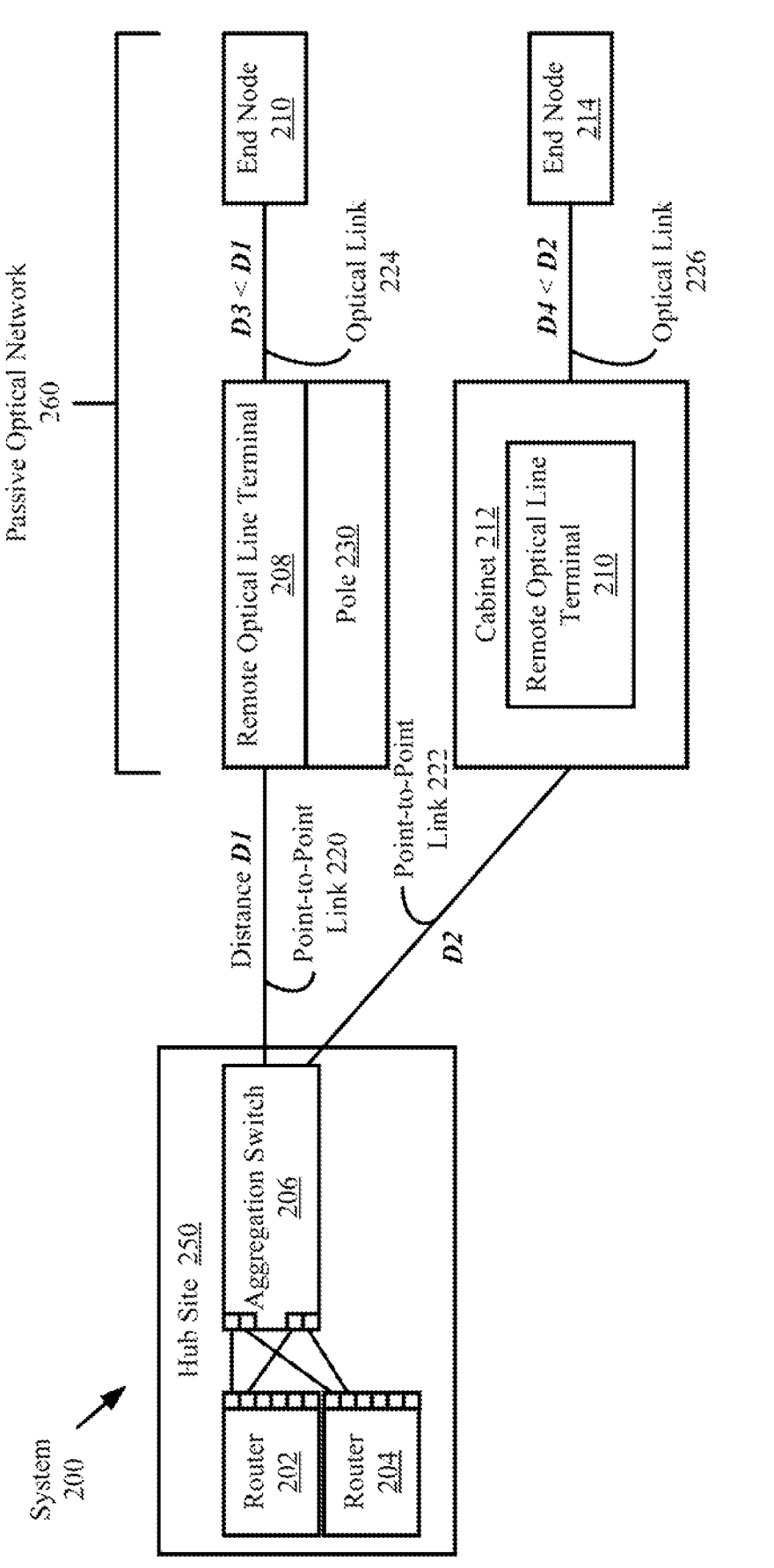
FIG. 2 provides an illustration of a conventional system with a PON.

Referring now to FIG. 2, there is provided an illustration of a conventional PON system 100. System 100 comprises a hub site 250 communicatively coupled to remote optical line terminals (OLTs) 208, 210 via point-to-point (PTP) links 220, 222. The PTP links 220, 222 can include, but is not limited to, Ethernet links. The hub site 250 includes routers 202, 204 and an aggregation switch 206. Routers and aggregation switches are well known and will not be described herein. The PTP links have associated distances D1 and D2. Distances D1, D2 may be the same as or different than each other. For example, distances are each less than or equal to eighty kilometers and/or greater than twenty kilometers (i.e., 20 km<D1<80 km and 20 km<D2<80 km. The present solution is not limited to the particulars of this example.

Data is respectively communicated from the aggregation switch 206 to the remote OLTs 208, 210. Each OLT 208, 210 is an endpoint of a PON 260 and is configured to convert PTP signals to optical signals and communicate the optical signals over an optical link 224, 226 to end node(s) 210, 214. The end nodes 210, 214 can include, but are not limited to, residential buildings, commercial buildings and/or public buildings. The optical links 224, 226 have associated distances D3 and D4. Each distance D3, D4 may be less than or equal to twenty kilo meters.

As shown in FIG. 2, remote OTL 208 is mounted on a pole 230 and remote OTL 210 is disposed in a cabinet 212. Both remote OTLs 208, 210 reside in a hardened industrial-temp (−40° C. to +85° C.) clamshell enclosure. Despite the advantages of the remote OLTs, they suffer from certain drawbacks. The drawbacks include reduced network reliability, increased cost, additional power requirements, cabinet and/or enclosure requirements, and/or require field technicians/equipment for repairs and replacements.

Many commonly deployed access networks need to be able to span forty to one hundred kilo meters to replace current remote OLT deployments. There are many PON standards (e.g., XGS PON, 25G PON, 50G PON, etc.) that use different wavelengths for their downstream and upstream optical links. These different wavelengths require different amplification technologies and have different chromatic dispersion properties. Two factors which impact performance and limit longer PON distances are chromatic dispersion tolerance and optical signal-to-noise ratio (OSNR).

The present solution concerns a PON extender (or integrated optical module) that sits next to the OLT inside the hub consisting of a combination of optical amplifiers and Raman amplifiers for amplifying optical signals with a low noise figure to reach longer distances. The optical amplifiers can include, but are not limited to, EDF As and/or SOAs. The combination of Raman amplifier(s) and other optical amplifiers (e.g., EDFAs/SOAs) enable the upstream and downstream optical signals to be amplified and achieve the requisite OSNR links (up to 100 km) to be supported without using remote OLTs.

Optical filters and Dispersion Compensation Modules (DCMs) may also be provided with the PON extender. The DCMs (either tunable or fixed distance) compensate for any chromatic dispersion effects. The optical filters guarantee the appropriate wavelength signal utilizes the appropriate amplification and DCM method for that specific wavelength. The present solution can be configured for specific wavelength bands (to cost reduce) or across all optical communication's wavelengths to enable universal coverage.

Figure 3:
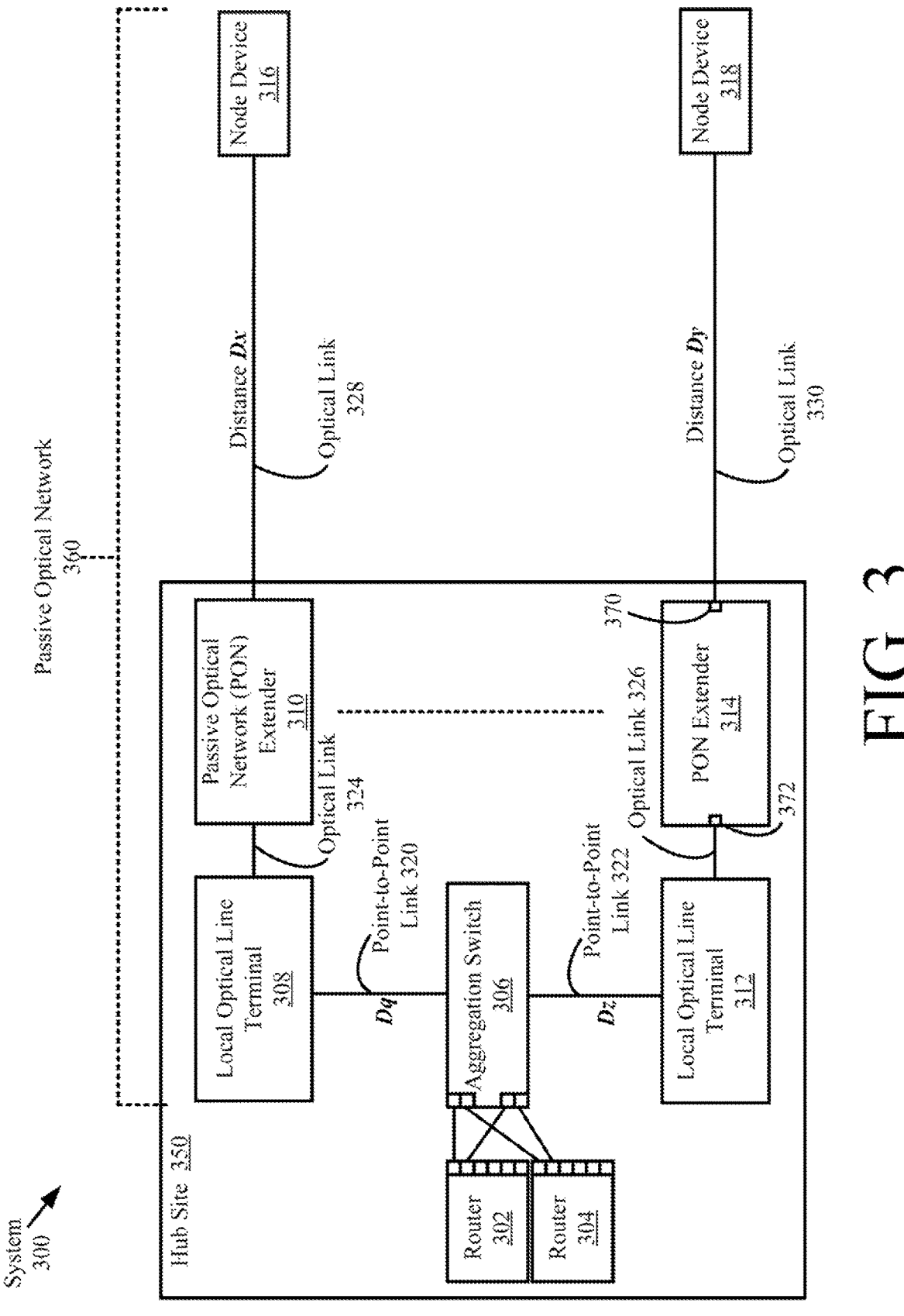
FIG. 3 provides an illustration of a system implementing the present solution.

Referring now to FIG. 3, there is provided an illustration of a system 300 implementing the present solution. System 300 comprises a hub site 350 communicatively coupled to node devices 316, 318 of a PON 360. Each node device 316, 318 is an endpoint of a PON 360. Each node device 316, 318 can include, but is not limited to, a residential building, a commercial building and/or a public building. Communications from the hub site 350 to an end node device 316, 318 are referred to herein as downlink communications. Communications from an end node device 316, 318 to the hub site 350 are referred to herein as uplink communications.

The hub site 350 comprises routers 302, 304 and an aggregation switch 306. Routers and aggregation switches are well known and will not be described herein. The aggregation switch 306 is coupled to local OLTs 308, 312 via PTP links 320, 322. The PTP links 320, 322 can include, but are not limited to, Ethernet links. Although two OLTs are shown in FIG. 3, system 300 can include any number of OLTs selected in accordance with a particular application.

The PTP links have associated distances $D_q$ and $D_z$. Distances $D_q$, $D_z$ may be the same as or different than each other. It should be noted that distances $D_q$ and $D_z$ are less than distances D1 and D2 of FIG. 2 since the OLTs 308, 312 are installed at hub site 350 rather than at remote sites. Consequently, the OLTs 308, 312 are disposed in a controlled environment. Thus, the hardened industrial-temp clamshell enclosures and field technicians not needed for the local OLTs. This results in significant cost savings and ease of maintaining the OLT equipment.

Data is respectively communicated from the aggregation switch 306 to the OLTs 308, 312. Each OLT 308, 312 is an endpoint of the PON 360 and is configured to convert PTP signals to optical signals and communicate the optical signals over an optical link 324, 326 to PON extenders 310, 314. Although two PON extenders are shown in FIG. 3, the present solution not limited in this regard. Any number of PON extenders can be provided in accordance with a given application.

Each PON extender 310, 314 is generally configured to (i) enable adequate optical power across necessary wavelengths to be received by the OLTs, (ii) manage chromatic dispersion affects in the PON, and (iii) provide the requisite OSNR for upstream communications in the PON. The manner in which operations (i)-(iii) are achieved will become evident as the discussion progresses. It should be noted at this time that the PON extenders 310, 314 amplify the downlink optical signals received from the OLTs 308, 312 via optical links 324, 326, and communicate the amplified downlink optical signals over optical links 328, 330 to the node devices 316, 318. The PON extenders 310, 314 amplify the uplink optical signals received from the node devices 316, 318 via optical links 328, 330, and communicate the amplified uplink optical signals over optical links 324, 326 to the OLTs 308, 312. Optical links 328, 330 have associated distances $D_x$ and $D_y$. Distances $D_x$ and $D_y$ may be greater than or equal to eight kilo meters and/or less than one hundred kilo meters.

Figure 4:
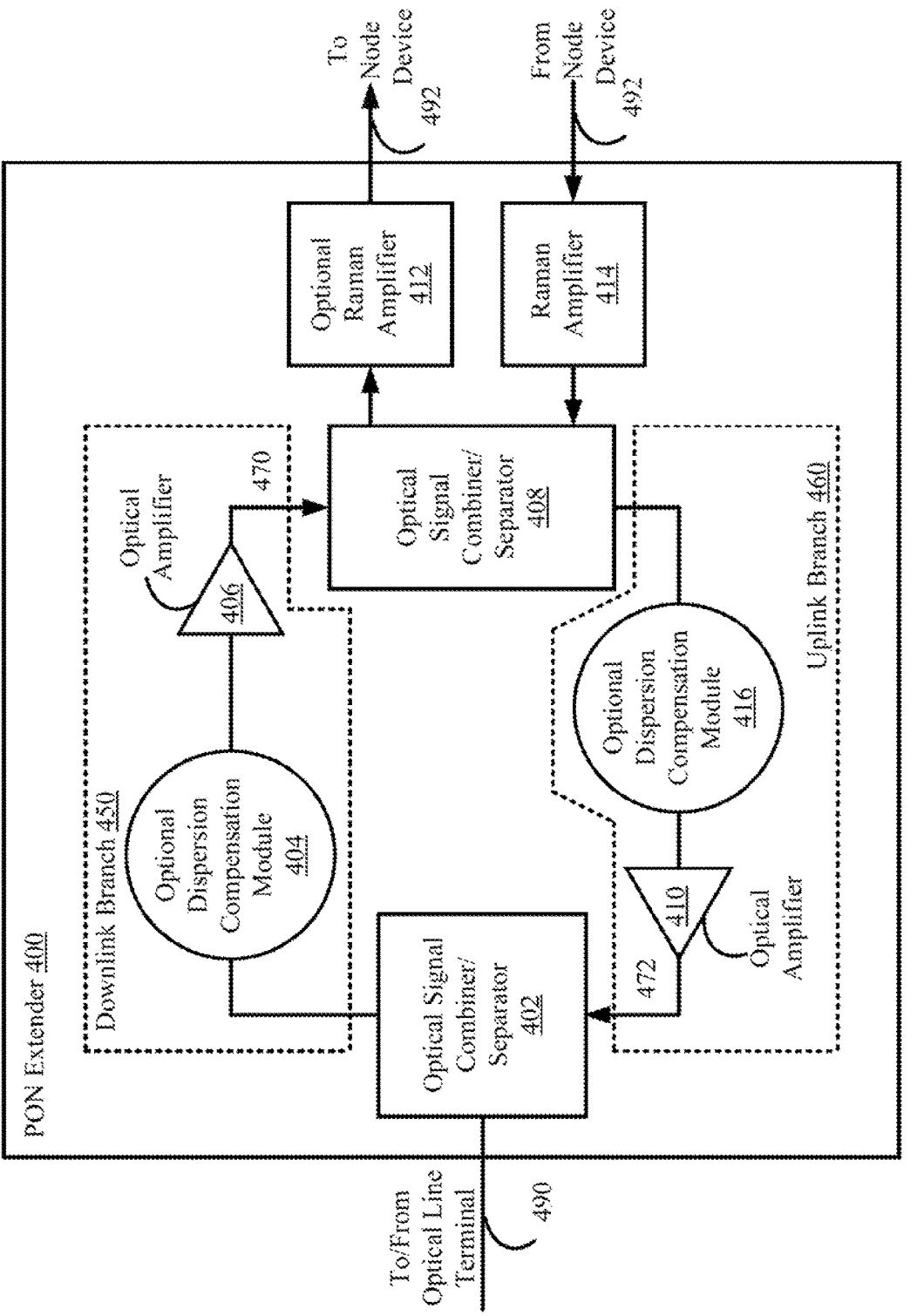
FIG. 4 provides an illustration of a PON extender architecture.

A more detailed block diagram of a PON extender 400 is provided in FIG. 4. PON extenders 310, 314 of FIG. 3 can be the same as or similar to PON extender 400. As such, the discussion of PON extender 400 is sufficient for understanding PON extenders 310, 314.

As shown in FIG. 4, the PON extender 400 comprises optical signal combiners/separators 402, 408, a downlink branch 450, an uplink branch 460, and Raman amplifiers 412, 414. Each optical signal combiner/separator can include, but is not limited to, a wavelength division multiplexer (WDM) or an optical circulator. WDMs and optical circulators are well known. Any known or to be known WDMs and/or optical circulators can be used here. Still, it should be noted that optical signal combiner/separator 402 is generally configured to: (1) receive optical signals communicated over a bi-directional optical link 490 and pass a downlink optical signal with a wavelength in a given band (e.g., L-band, C-band or O-band) to the downlink branch 450; and (2) receive an uplink optical signal from the uplink branch 460 and cause the uplink optical signal to be communicated over the bi-directional link 490. Similarly, optical signal combiner/separator 408 is generally configured to: (1) receive a downlink optical signal from the downlink branch 450 and cause the downlink optical signal to be communicated via a bi-directional optical link 492; and (2) receive optical signals communicated over the bi-directional optical link 492 and pass an uplink optical signal with a wavelength in a given band (e.g., L-band, C-band or O-band) to the uplink branch 460.

The downlink branch 450 comprises an optional DCM 404 and an optical amplifier 406. DCMs are well known. Still, it should be understood that the DCM 404 is configured to compensate a cumulative dispersion in an optical fiber of the bi-directional communication link 490. Any known or to be known DCM can be used here.

The optical amplifier 406 can include, but is not limited to, an EDFA or an SOA. EDFAs and SOAs are well known devices for amplifying an optical signal directory, without the need to first convert it to an electrical signal. Any known EDFA or SOA can be used here. The EDFA can be used to amplify optical signals with wavelengths in the L-band or C-band. The SOA can be used to amplify optical signals with wavelength in the O-band. The amplified optical signal 470 is passed from the optical amplifier 406 to the optical signal combiner/separator 408. As noted above, the optical signal combiner/separator 408 causes the downlink optical signal to be communicated to a node device (e.g., node device 316 or 318 of FIG. 3) via a bi-directional optical link 492 (e.g., optical link 328 or 330 of FIG. 3).

A Raman amplifier 412 may be provided between the optical signal combiner/separator 408 and the node device. Raman amplifiers are well known. Any known or to be known Raman amplifier can be used here. The Raman amplifier 412 may include, but is not limited to, Raman pumps, a polarization beam combiner (PBC), an optical signal combiner (e.g., a WDM and/or an optical circulator). The Raman amplifier 412 is configured to boost the optical signal in the optical fiber by transferring energy from a Raman pump beam to a weaker signal beam. The Raman amplification allows for an increased distance between the PON extender and the node device.

With regard to uplink optical signals, the PON extender 400 comprises a Raman amplifier 414 for amplifying the same prior to it reaching the optical signal combiner/separator 408. Raman amplifier 414 can be the same as or similar to Raman amplifier 412. As noted above, the optical signal combiner/separator 408 passes the uplink optical signal to the uplink branch 460.

The uplink branch 460 comprises an optional DCM 416 and an optical amplifier 410. DCMs and optical amplifiers are well known. Any known or to be known DCM and/or optical amplifier can be used here. DCM 416 can be the same as, similar to or different than DCM 404. DCM 416 is configured to compensate a cumulative dispersion in an optical fiber of the bi-directional communication link 492.

The optical amplifier 410 can be the same as, similar to or different than optical amplifier 406. Optical amplifier 410 can include, but is not limited to, an EDFA or an SOA. EDFAs and SOAs are well known devices for amplifying an optical signal directory, without the need to first convert it to an electrical signal. Any known EDFA or SOA can be used here. The EDFA can be used to amplify optical signals with wavelengths in the L-band or C-band. The SOA can be used to amplify optical signals with wavelength in the O-band. The amplified optical signal 472 is passed from the optical amplifier 410 to the optical signal combiner/separator 402. As noted above, the optical signal combiner/separator 402 causes the uplink optical signal to be communicated to an OLT (e.g., OLT 308 or 312 of FIG. 3) via a bi-directional optical link 490 (e.g., optical link 320 or 322 of FIG. 3).

PON extender 400 addresses the drawbacks of conventional solutions by: using a mix of optical amplification methods consisting of optical amplifiers (e.g., EDFAs and/or SOAs) and Raman pump(s) to enable adequate optical power across necessary wavelengths to be received by an optical network terminal (ONT) (e.g., node device 316 or 318 of FIG. 3) and OLT (e.g., OLT 308 or 312 of FIG. 3); use DCM(s) to allow for the management of dispersion only for wavelengths that will be affected by chromatic dispersion; and use a combination of an optical amplifier (e.g., an SOA) and a Raman pump to provide requisite OSNR for upstream PON.

There are many novel features of PON extender 400. Some of the novel features include: an innovative combination of Raman amplifier(s), optical amplifiers (e.g., EDFAs and/or SOAs), and DCM(s) which allows the OSNR and link budget of greater than twenty kilo meter links to be met for all wavelengths defined by the various PON standards; upstream Raman pumps combined with optical amplifier(s) which enables a larger gain bandwidth with a lower noise figure compared to other amplification techniques employed to enable the use of lower cost components for customer equipment; integrated components in a single module enabling ease of deployment in a hub site (e.g., hub site 350 of FIG. 3) alongside the OLT hardware; allows an upgrade path across different PON standards (e.g., XGSPON to 25/50G PON), with different wavelengths, using the same PON extender; purely passive solution for outside plant usage bringing down total cost of ownership over Remote-OLT solutions; no environmentally hardened electronics required which improves reliability; and no active equipment outside of the hub site which reduces the need for powering and maintaining external equipment and limits the need for expensive truck rolls to remote locations for maintenance.

Figure 5:
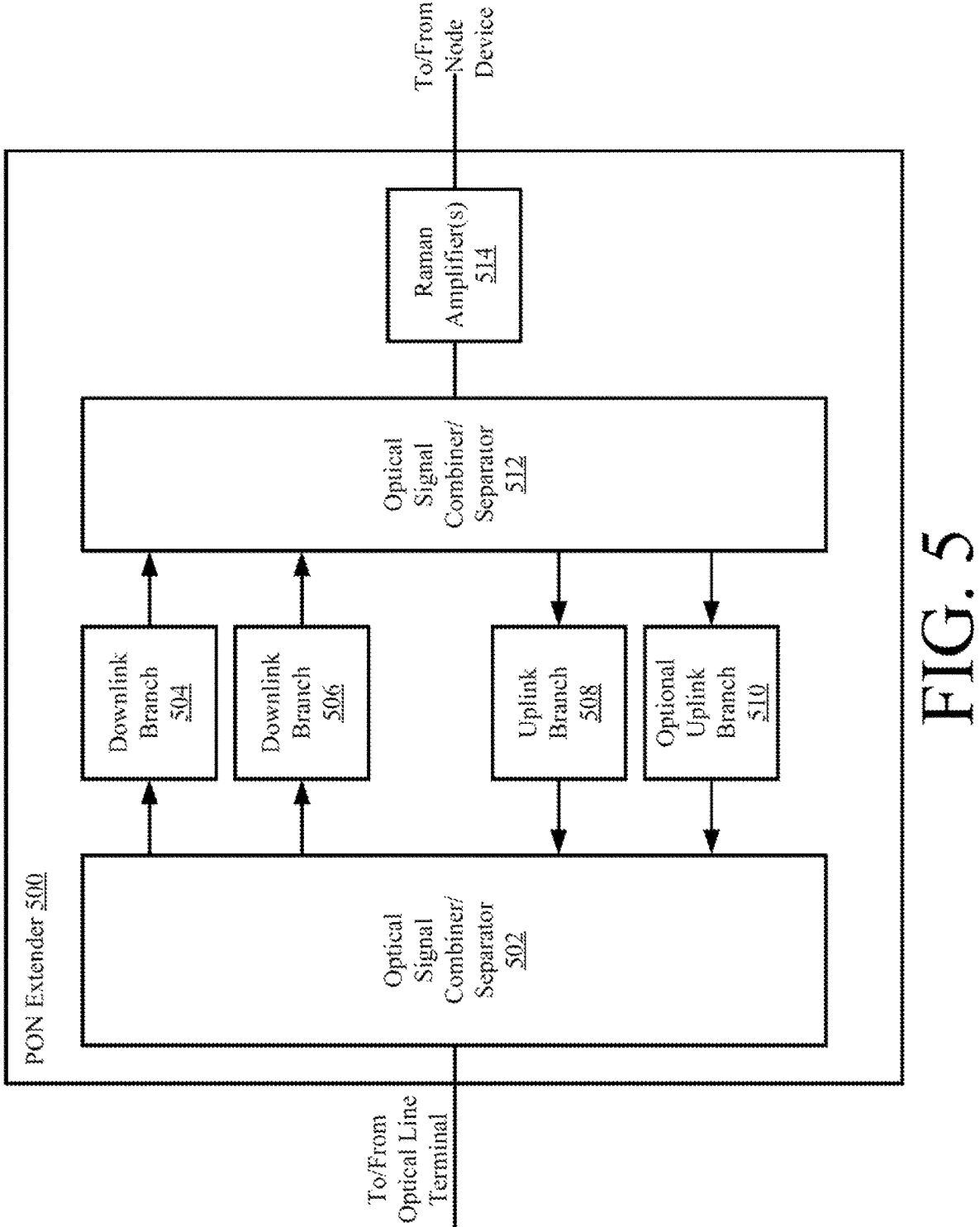
FIG. 5 provides an illustration of another PON extender architecture.

FIG. 5 shows an illustrative architecture for another PON extender 500. PON extender 500 comprises optical signal combiners/separators 502, 512, downlink branches 504, 506, Raman amplifier(s) 514 and uplink branch(es) 508, 510. Optical signal combiners/separators 502, 512 are the same as or similar to optical signal combiners/separators 402, 408 of FIG. 4. Each downlink branch 504, 506 may be the same as or similar to downlink branch 450 of FIG. 4. However, the downlink branches 504, 506 are configured to amplify optical signals with wavelengths in respective bands of a plurality of bands. For example, downlink branch 504 is configured to amplify optical signals in the O-band (e.g., 1340-1360 nm). Thus, the optical amplifier of the downlink branch 504 comprises an SOA. Downlink branch 506 is configured to amplify optical signals in the L-band and/or C-band (e.g., 1577 nm). Thus, downlink branch 506 comprises an EDFA. DCMs may be provided in each downlink branch 504, 506 prior to the optical amplifiers. The present solution is not limited to the particulars of this example.

Each uplink branch 508, 510 can be the same as or similar to uplink branch 460 of FIG. 4. However, the uplink branches 508, 510 can be configured to amplify optical signals in respective bands of a plurality of bands. For example, uplink branch 508 is configured to amplify optical signals with wavelengths in the O-band (e.g., 1270 nm). Thus, the optical amplifier of the uplink branch 508 can include an SOA. Uplink branch 510 is configured to amplify optical signals with wavelengths in the L-band and/or C-band. Thus, the optical amplifier of the uplink branch 508 can include an EDFA. DCMs may optionally be provided in each uplink branch 508, 510 between the optical amplifiers and the optical signal combiner/separator 512. The present solution is not limited to the particulars of this example.

Referring now to FIG. 6 there is provided a flow diagram of a method 600 for operating a PON extender (e.g., PON extender 310 of FIG. 3, 314 of FIG. 3, 400 of FIG. 4 or 500 of FIG. 5). Method 600 begins with 602 and continues with 604 which involves providing a first optical link (e.g., bidirectional optical link 328 or 330 of FIG. 3) between a first terminal (e.g., terminal 370 of FIG. 3) of the PON extender and a remote node device (e.g., node device 316 or 318 of FIG. 3) of a PON (e.g., PON 360 of FIG. 3). A second optical link (e.g., bidirectional optical link 324 or 326 of FIG. 3) is provided in 606 directly between a second terminal (e.g., terminal 372 of FIG. 3) of the passive optical network extender and an OLT (e.g., OLT 308 or 312 of FIG. 3) of the PON.

In 608, the PON extender receives a first optical signal from the remote node device via the first optical link. The first optical signal is amplified at the PON extender using a first Raman amplifier (e.g., Raman amplifier 414 of FIG. 4 or 514 of FIG. 5) to obtain a first Raman amplified optical signal, as shown by 610. The PON extender may optionally perform operations in 612-614 to: separate the first Raman amplified optical signal from a plurality of optical signals communicated over the first optical link; and/or compensate a cumulative dispersion in an optical fiber of the first optical link.

In 616, the first Raman amplified optical signal is amplified using a first optical amplifier (e.g., optical amplifier 410 of FIG. 4) of the passive optical network extender to obtain an amplified uplink signal (e.g., signal 472 of FIG. 4). The first optical amplifier is different than the Raman amplifier. The first optical amplifier may include, but is not limited to, an EDFA or an SOA. The amplified uplink signal is communicated to the OLT via the second optical link, as shown by 618. It should be noted once again that the OLT is disposed locally at a hub site along with the PON extender. Upon completing 618, method 600 continues with 620 of FIG. 6B.

Figure 6B:
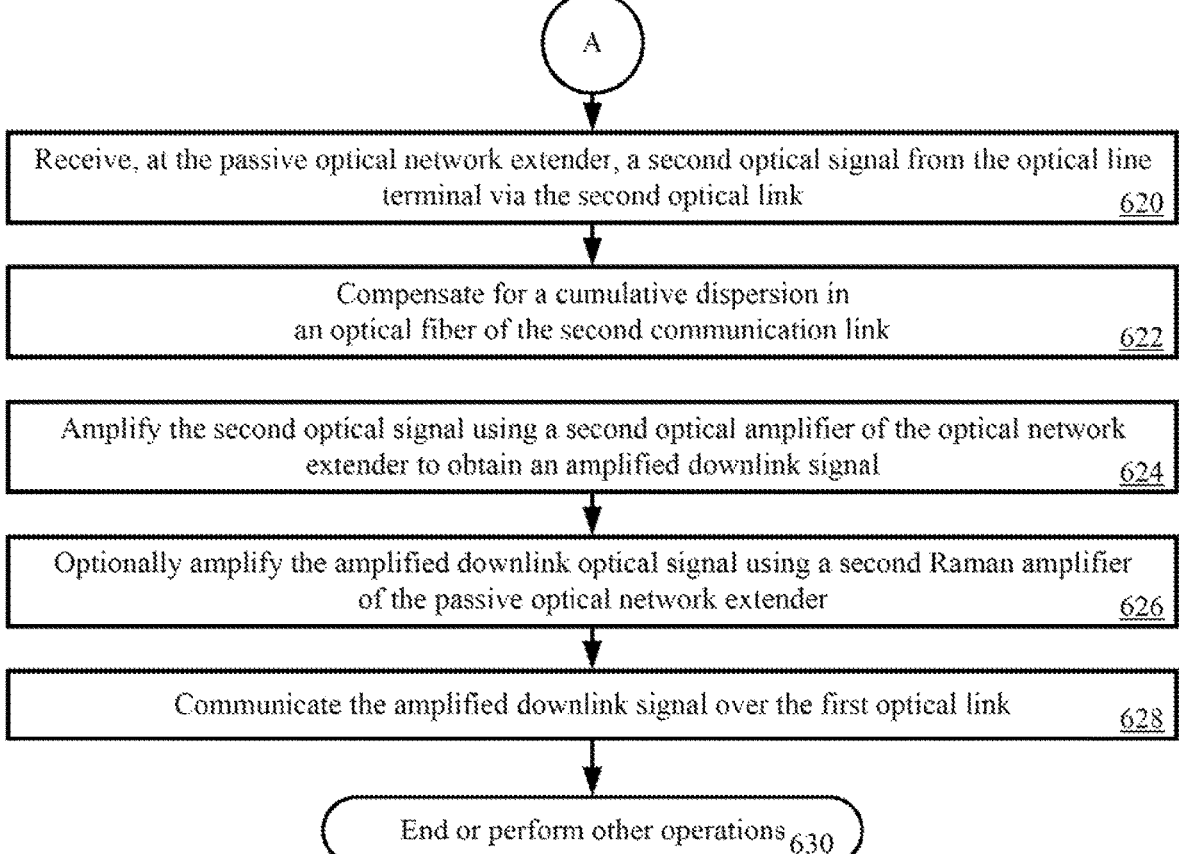

As shown in FIG. 6B, 620 involves receiving, at the PON extender, a second optical signal from the OLT via the second optical link. The PON extender performs operations in 622 to compensate for a cumulative dispersion in an optical fiber of the second optical link. The PON then amplifies the second optical signal using a second optical amplifier (e.g., optical amplifier 406 of FIG. 4) to obtain an amplified downlink signal (e.g., signal 470 of FIG. 4). The second optical amplifier can include, but is not limited to, an EDFA or an SOA. The amplified downlink signal may optionally be further amplified using a second Raman amplifier (e.g., Raman amplifier 412 of FIG. 4 or 514 of FIG. 5) of the PON extender. The amplified downlink signal is then communicated over the first optical link, as shown by 618. This communication can involve performing operations by the PON extender to combine the amplified downlink optical signal with a plurality of optical signals communicated over the second optical link. In this case, the Raman amplifier would reside after or downstream from the optical signal combiner (e.g., optical signal combiner 408 of FIG. 4) of the PON extender. Thus, the order of blocks 626 and 628 may be changed from that which is shown in FIG. 6B. Subsequently, method 600 ends or other operations are performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a passive optical network extender, comprising:

receiving, by the passive optical network extender, a first optical signal from a remote node device of a passive optical network via a first optical link wherein the first optical signal comprises wavelengths in the O-band, L-band, and/or C-band;

amplifying the O-band of the first optical signal using a first Raman amplifier of the passive optical network extender to obtain a first Raman amplified optical signal;

separating the O-band of the first Raman amplified optical signal from the L-band and/or the C-band of the first Raman amplified optical signal;

amplifying the O-band of the first Raman amplified optical signal using a first optical amplifier of the passive optical network extender to obtain a first amplified uplink signal, wherein the first optical amplifier is a semiconductor optical amplifier (SOA) or a bismuth-doped fiber amplifier (BDFA);

amplifying the L-band and/or the C-band of the first Raman amplified optical signal using a second optical amplifier of the passive optical network extender to obtain a second amplified uplink signal, wherein the second optical amplifier is an Erbium-doped fiber amplifier (EDFA); and passing the amplified first and second uplink signals to an optical line terminal via a second optical link, wherein the optical line terminal is disposed locally at a hub site along with the passive optical network extender.

2. The method according to claim 1, further comprising providing the first optical link between a first terminal of the passive optical network extender and the remote node device of the passive optical network.

3. The method according to claim 2, further comprising providing the second optical link directly between a second terminal of the passive optical network extender and the optical line terminal of the passive optical network.

4. The method according to claim 1, further comprising performing operations by the passive optical network extender to separate the first optical signal from a plurality of optical signals communicated over the first optical link, after amplification by the Raman amplifier and before amplification by the first optical amplifier.

5. The method according to claim 1, further comprising performing operations by the passive optical network extender to compensate a cumulative dispersion in an optical fiber of the first optical link.

6. The method according to claim 5, wherein compensation of the cumulative dispersion in the optical fiber is performed after amplification by the Raman amplifier and before amplification by the first optical amplifier.

7. The method according to claim 1, further comprising:

receiving, at the passive optical network extender, a second optical signal from the optical line terminal via the second optical link;

amplifying the second optical signal using a second optical amplifier of the passive optical network extender to obtain an amplified downlink signal; and passing the amplified downlink signal to the remote node device of the passive optical network via the first optical link.

8. The method according to claim 7, further comprising amplifying the amplified downlink optical signal using a second Raman amplifier of the passive optical network extender.

9. The method according to claim 8, further comprising performing operations by the passive optical network extender to combine the amplified downlink optical signal with a plurality of optical signals communicated over the second optical link, after amplification by the second optical amplifier and before amplified by the second Raman amplifier.

10. The method according to claim 7, further comprising performing operations by the passive optical network extender to compensate a cumulative dispersion in an optical fiber of the second optical link.

11. A system, comprising:

a passive optical network extender disposed at a hub site, and comprising:

a first terminal configured to receive a first optical signal from a remote node device of a passive optical network via a first optical link, wherein the first optical signal comprises wavelengths in the O-band, L-band, and/or C-band;

a first Raman amplifier configured to amplify the O-band of the first optical signal to produce a first Raman amplified optical signal;

an optical signal combiner/separator configured to separate the O-band of the first Raman amplified optical signal from the L-band and/or the C-band of the first Raman amplified optical signal;

a first optical amplifier configured to amplify the O-band of the first Raman amplified optical signal to produce a first amplified uplink signal, wherein the first optical amplifier is a semiconductor optical amplifier (SOA);

a second optical amplifier configured to amplify the L-band and/or the C-band of the first Raman amplified optical signal to obtain a second amplified uplink signal, wherein the second optical amplifier is an Erbium-doped fiber amplifier (EDFA); and a second terminal from which the first and second amplified uplink signals can be passed to an optical line terminal of the passive optical network via a second optical link.

12. The system according to claim 11, wherein the optical line terminal is disposed at the hub site along with the passive optical network extender.

13. The system according to claim 11, wherein the first optical link is provided between the first terminal of the passive optical network extender and the remote node device.

14. The system according to claim 13, wherein the second optical link is provided directly between the second terminal of the passive optical network extender and the optical line terminal.

15. The system according to claim 11, wherein the passive optical network extender further comprises an optical signal separator connected between the Raman amplifier and the first optical amplifier, and configured to separate the first optical signal from a plurality of optical signals communicated over the first optical link.

16. The system according to claim 11, wherein the passive optical network extender further comprises a dispersion compensation module configured to compensate a cumulative dispersion in an optical fiber of the first optical link.

17. The system according to claim 16, wherein the dispersion compensation module is disposed between the Raman amplifier and the first optical amplifier such that any compensation of the cumulative dispersion in the optical fiber is performed after amplification by the Raman amplifier and before amplification by the first optical amplifier.

18. The system according to claim 11, wherein the passive optical network extender further comprises a second optical amplifier configured to amplify a second optical signal received from the optical line terminal via the second optical link to produce an amplified downlink signal.

19. The system according to claim 18, wherein the passive optical network extender further comprises a second Raman amplifier configured to amplify the amplified downlink optical signal.

20. The system according to claim 19, wherein the passive optical network extender further comprises an optical signal combiner disposed between the second Raman amplifier and the second optical amplifier, and configured to combine the amplified downlink optical signal with a plurality of optical signals communicated over the second optical link.

21. The system according to claim 18, wherein the passive optical network extender further comprises a dispersion compensation module configured to compensate a cumulative dispersion in an optical fiber of the second optical link.

* * * * *